US012769249B2

(12) United States Patent
Sato

(10) Patent No.: US 12,769,249 B2
(45) Date of Patent: Oct. 20, 2026

(54) IMAGE-FORMING APPARATUS INCLUDING DEVELOPING UNIT AND DRUM UNIT TO WHICH TONER CONTAINER IS CONNECTABLE, AND PROCESS UNIT CONFIGURED BY THE DRUM UNIT AND DEVELOPING UNIT

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/211,884

(22) Filed: May 19, 2025

(65) Prior Publication Data

US 2026/0016786 A1 Jan. 15, 2026

(30) Foreign Application Priority Data

Jul. 10, 2024 (JP) ................................ 2024-111349

(51) Int. Cl.
*G03G 15/08* (2006.01)
*G03G 21/16* (2006.01)
*G03G 21/18* (2006.01)

(52) U.S. Cl.
CPC ..... *G03G 21/1821* (2013.01); *G03G 15/0808* (2013.01); *G03G 15/0898* (2013.01); *G03G 21/1633* (2013.01); *G03G 21/1647* (2013.01); *G03G 21/1814* (2013.01); *G03G 21/1825* (2013.01); *G03G 2221/1648* (2013.01)

(58) Field of Classification Search
CPC ........... G03G 15/0808; G03G 15/0865; G03G 15/0898; G03G 21/1633; G03G 21/1647; G03G 21/1676; G03G 21/1814; G03G 21/1821; G03G 21/1825; G03G 2221/1648
See application file for complete search history.

(56) References Cited

U.S. PATENT DOCUMENTS

| | | | | |
|---|---|---|---|---|
| 2021/0405555 A1 | 12/2021 | Ogawa et al. | | |
| 2023/0004118 A1* | 1/2023 | Sato | | |
| 2023/0168601 A1 | 6/2023 | Fukui et al. | | |
| 2024/0004328 A1* | 1/2024 | Sato | ................... | G03G 15/0865 |
| 2026/0010116 A1* | 1/2026 | Sato | ................... | G03G 21/1633 |

FOREIGN PATENT DOCUMENTS

| | | |
|---|---|---|
| JP | 2020-154301 A | 9/2020 |
| JP | 2023-81064 A | 6/2023 |

* cited by examiner

*Primary Examiner* — Sophia S Chen
(74) *Attorney, Agent, or Firm* — Merchant & Gould P.C.

(57) ABSTRACT

An image-forming apparatus includes a main housing, a drum unit, a developing unit, and a seal member. The drum unit includes a photosensitive drum, an inlet port, an outlet port, and a connecting part connecting the inlet port to the outlet port. A toner container storing toner is connectable to the inlet port. The developing unit includes a developing roller, and a supply port connected to the outlet port. The seal member is interposed between the outlet port and the supply port. The seal member is elastically deformable to allow the supply port to move relative to the outlet port. The drum unit and developing unit constitute a process cartridge. In a state where the process cartridge is mounted in the main housing, the inlet port, the outlet port and the supply port at least partially overlap each other when viewed in an up-down direction.

14 Claims, 10 Drawing Sheets

IMAGE-FORMING APPARATUS INCLUDING DEVELOPING UNIT AND DRUM UNIT TO WHICH TONER CONTAINER IS CONNECTABLE, AND PROCESS UNIT CONFIGURED BY THE DRUM UNIT AND DEVELOPING UNIT

REFERENCE TO RELATED APPLICATIONS

This application claims priority from Japanese Patent Application No. 2024-111349 filed on Jul. 10, 2024. The entire content of the priority application is incorporated herein by reference.

BACKGROUND ART

There has been known a conventional image-forming apparatus that includes a drum unit having a photosensitive drum, and a developing unit having a developing roller. The developing unit of this image-forming apparatus is configured to move relative to the drum unit in directions for moving the developing roller toward and away from the photosensitive drum.

In the conventional image-forming apparatus described above, the drum unit and the developing unit constitute a process cartridge. A toner pack, which is a container for supplying toner to the developing unit, is configured to be mounted into a toner receptacle of the developing unit so that the toner from the toner pack can be supplied into a toner chamber of the developing unit.

SUMMARY

However, since the developing unit is configured to move relative to the drum unit, the position of the toner receptacle becomes unstable when the toner pack is mounted into the toner receptacle. As a result, it is conceivable that the operation to mount the toner pack into the toner receptacle of the developing unit may be difficult to perform.

Further, an impact may be inadvertently transmitted to the toner receptacle of the developing unit when the toner pack is being mounted into the toner receptacle. As a result of such an impact, since the developing unit is configured to move relative to the drum unit, the developing roller and spacers, which are configured to contact the photosensitive drum, could damage the photosensitive drum.

In view of the foregoing, it is an object of the present disclosure to provide an image-forming apparatus and a process unit in which a toner container for replenishing toner can be easily connected to a process cartridge.

In order to attain the above and other objects, according to one aspect, the present disclosure provides an image-forming apparatus including a main housing, a drum unit, a developing unit, and a seal member. The drum unit includes a photosensitive drum, an inlet port, an outlet port, and a connecting part. A toner container storing toner is connectable to the inlet port for receiving the toner from the toner container. The connecting part connects the inlet port to the outlet port. The developing unit includes a developing roller, and a supply port connected to the outlet port. The seal member is interposed between the outlet port and the supply port for sealing a gap therebetween. The seal member is elastically deformable to allow the supply port to move relative to the outlet port. The drum unit and the developing unit constitute a process cartridge mountable in the main housing. In a state where the process cartridge is mounted in the main housing, the inlet port, the outlet port and the supply port are arranged such that at least a part of the inlet port, a part of the outlet port and a part the supply port overlap each other when viewed in an up-down direction.

With this configuration, the toner container can be easily connected to the process cartridge, even if the developing unit is configured to move relative to the drum unit. Moreover, the developing unit can easily be replenished with the toner from the toner container since the toner in the toner container can flow smoothly into the developing unit through the inlet port, outlet port, and supply port.

According to another aspect, the present disclosure also provides a process unit including a drum unit, a developing unit attached to the drum unit, and a seal member. The drum unit includes a photosensitive drum, an inlet port, an outlet port, and a connecting part. A toner container storing toner is connectable to the inlet port for receiving the toner from the toner container. The connecting part connects the inlet port to the outlet port. The developing unit includes a developing roller, and a supply port connected to the outlet port. The seal member is interposed between the outlet port and the supply port for sealing a gap therebetween. The seal member is elastically deformable to allow the supply port to move relative to the outlet port. The inlet port, the outlet port and the supply port are arranged such that at least a part of the inlet port, a part of the outlet port and a part of the supply port overlap each other when viewed in a direction in which the outlet port and the supply port are connected to each other.

With this configuration, the toner container can be easily connected to the process unit, even if the developing unit is configured to move relative to the drum unit. Moreover, the developing unit can easily be replenished with the toner from the toner container since the toner in the toner container can flow smoothly into the developing unit through the inlet port, outlet port, and supply port.

DESCRIPTION

Hereinafter, an embodiment of the present disclosure will be described while referring to the accompanying drawings.

[Image-Forming Apparatus]

Figure 1:
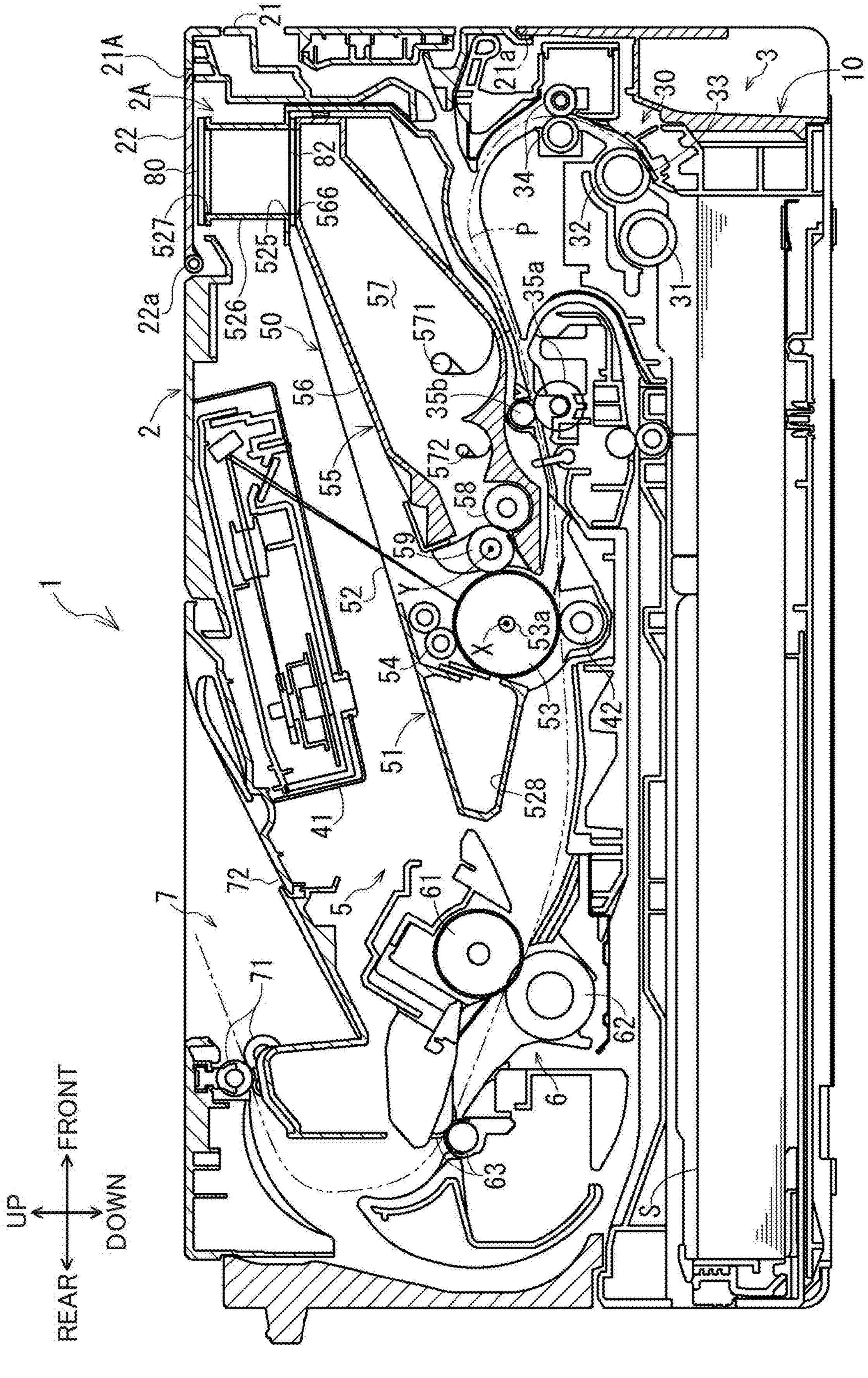
FIG. 1 is a central cross-sectional view of an image-forming apparatus.

An image-forming apparatus 1 illustrated in FIG. 1 is an image-forming apparatus according to one embodiment of the present disclosure. Specifically, the image-forming apparatus 1 is a laser printer configured to form images on sheets S according to the electrophotographic method.

In the following description, the right side in FIG. 1 is defined as the front side of the image-forming apparatus 1, the left side in FIG. 1 is defined as the rear side of the image-forming apparatus 1, the near side in FIG. 1 is defined as the left side of the image-forming apparatus 1, and the far side in FIG. 1 is defined as the right side of the image-forming apparatus 1. Further, the top and bottom sides in FIG. 1 are defined as the top and bottom of the image-forming apparatus 1, respectively.

The image-forming apparatus 1 includes a main housing 2, a sheet-feeding unit 3, an image-forming unit 5, a fixing device 6, and a discharge unit 7. The main housing 2 accommodates the sheet-feeding unit 3, image-forming unit 5, fixing device 6, and discharge unit 7. The main housing 2 is an example of "main housing" of the disclosure.

Figure 2:
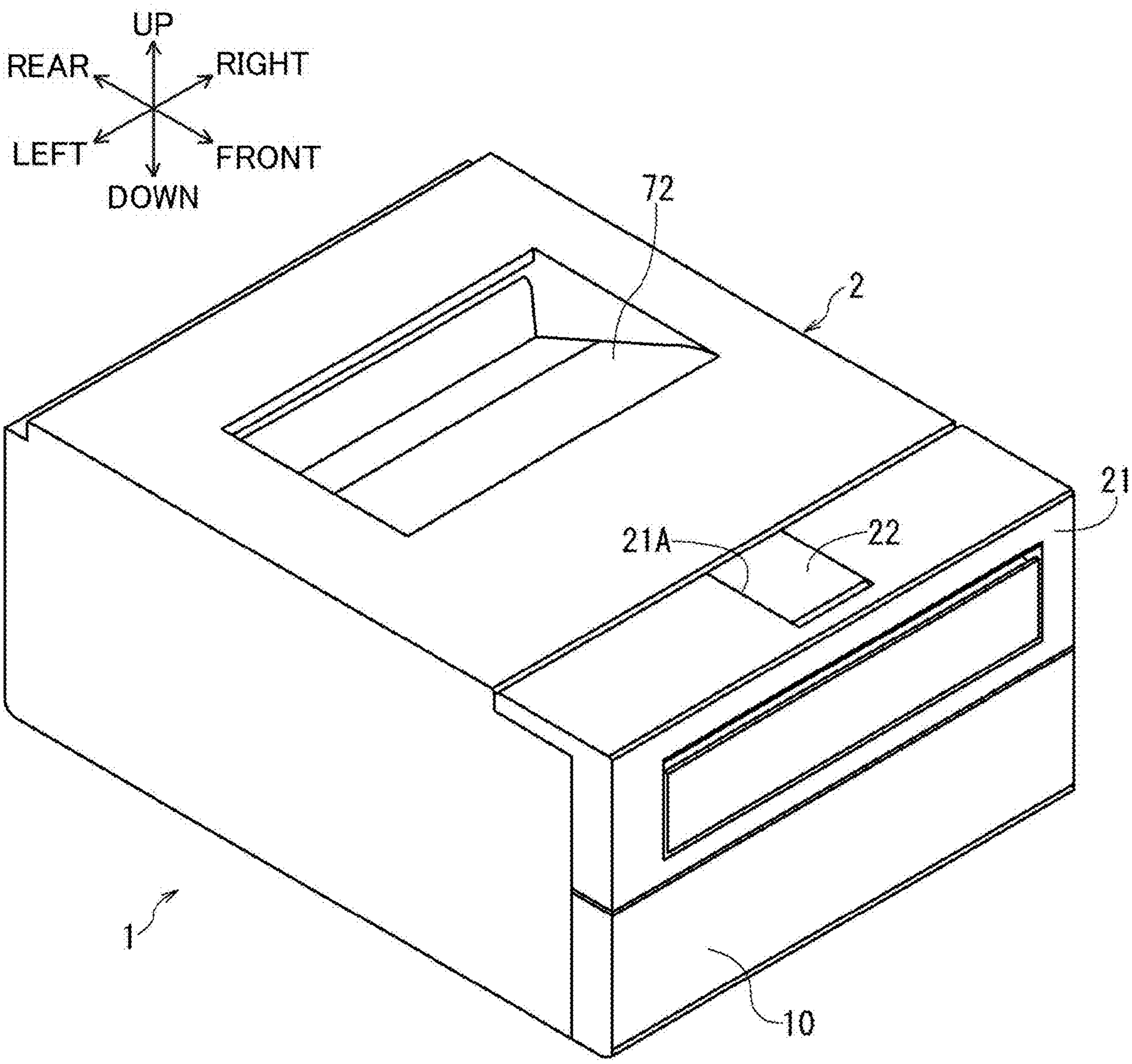
FIG. 2 is a perspective view of the image-forming apparatus in a state where a front cover is in a first closed position thereof and a refill cover is in a second closed position thereof.
Figure 3:
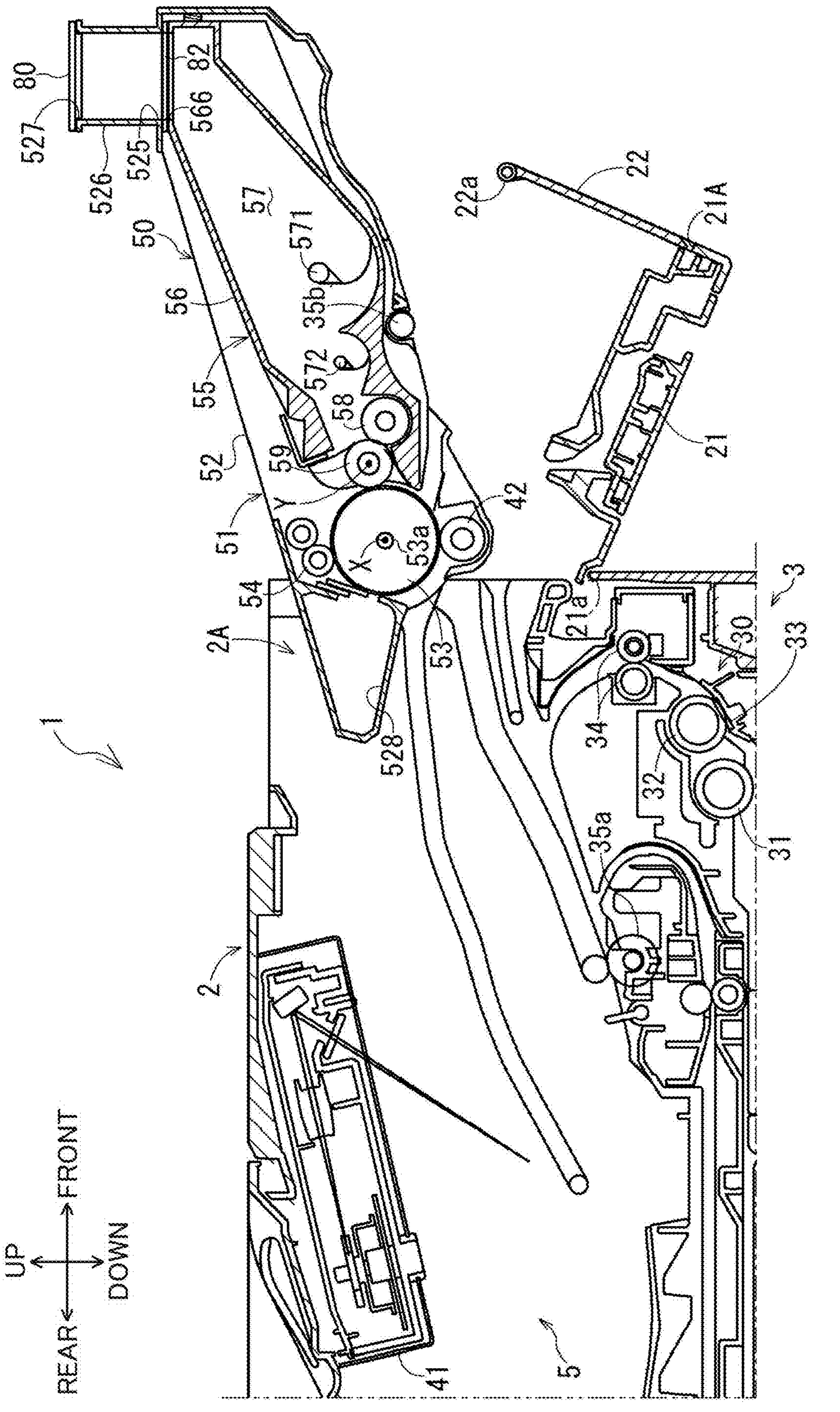
FIG. 3 is a cross-sectional side view illustrating a state where the front cover is in a first open position and a process cartridge is removed from a main housing through an opening.

As illustrated in FIGS. 1 through 3, an opening 2A is formed in a front end portion of the main housing 2. The main housing 2 includes a front cover 21 that can open and close the opening 2A.

The front cover 21 is pivotable about an axis of a pivot shaft 21*a* provided at a bottom end of the front cover 21. The pivot shaft 21*a* extends in a left-right direction. By pivoting about the axis of the pivot shaft 21*a*, the front cover 21 is movable between a first closed position (illustrated in FIG. 1) for covering the opening 2A and a first open position (illustrated in FIG. 3) for exposing the opening 2A. The front cover 21 is positioned farther forward in the first open position than in the first closed position. The front cover 21 is an example of "first cover" of the disclosure. The opening 2A is an example of "first opening" of the disclosure.

The sheet-feeding unit 3 includes a sheet tray 10 configured to support the sheets S, a sheet conveying unit 30, a conveying roller pair 34, and a registration roller 35*a*. The sheet-feeding unit 3 is arranged in a bottom section of the main housing 2. The sheet-feeding unit 3 is configured to convey the sheets S supported on the sheet tray 10 to the image-forming unit 5. The image-forming apparatus 1 has a conveying path P for conveying the sheets S from the sheet-feeding unit 3 to the discharge unit 7 through the image-forming unit 5.

The sheet conveying unit 30 is a conveying mechanism that functions to pick up the sheets S accommodated in the sheet tray 10, separate the sheets S one by one, and convey each separated sheet S toward the image-forming unit 5. The sheet conveying unit 30 includes a feed roller 31, a separating roller 32, and a separating pad 33.

The feed roller 31 is configured to feed the sheets S supported on the sheet tray 10 toward the separating roller 32. The separating roller 32 is arranged downstream of the feed roller 31 in a sheet conveying direction. The separating pad 33 is arranged to face the separating roller 32 and is urged toward the separating roller 32.

The sheets S fed toward the separating roller 32 by the feed roller 31 are separated one by one between the separating roller 32 and the separating pad 33. The separated sheets S are then conveyed onto the conveying path P one by one.

The sheets S fed onto the conveying path P are then conveyed to the image-forming unit 5 by the conveying roller pair 34, the registration roller 35*a*, and a pinch roller 35*b* arranged to face the registration roller 35*a*. The registration roller 35*a* is configured to first halt movement of each sheet S by contacting a leading edge of the conveyed sheet S and then convey the sheet S toward the image-forming unit 5 at a prescribed timing.

The image-forming unit 5 is disposed downstream of the sheet-feeding unit 3 in the sheet conveying direction. The image-forming unit 5 is configured to form images on the sheets S conveyed from the sheet-feeding unit 3. The image-forming unit 5 includes a process cartridge 50 configured to transfer an image onto a surface of each sheet S conveyed from the sheet-feeding unit 3, and an exposure unit 41 configured to expose a surface of a photosensitive drum 53 provided in the process cartridge 50.

The process cartridge 50 is detachably mountable in the main housing 2. The process cartridge 50 includes a drum unit 51, and a developing unit 55. The process cartridge 50 is mounted in the main housing 2 with the developing unit 55 attached to the drum unit 51. When mounted in the main housing 2, the process cartridge 50 is positioned above the sheet-feeding unit 3.

The drum unit 51 includes the photosensitive drum 53, a charging roller 54, and a transfer roller 42. The developing unit 55 has a toner chamber 57, a supply roller 58, and a developing roller 59. The drum unit 51 supports the pinch roller 35*b*.

As illustrated in FIG. 3, the opening 2A of the main housing 2 allows passage of the process cartridge 50. Therefore, by moving the front cover 21 into the first open position, the process cartridge 50 can easily be mounted in and removed from the main housing 2 through the opening 2A. The process cartridge 50 mounted in the main housing 2 is to be removed from the main housing 2 when the process cartridge 50 needs to be replaced or when a sheet S causes a paper jam, for example.

The process cartridge 50 is configured to be mounted in the main housing 2 by inserting the drum unit 51 and the developing unit 55 attached to the drum unit 51 together into the main housing 2. The process cartridge 50 is configured to be removed from the main housing 2 by pulling the drum unit 51 and the developing unit 55 attached to the drum unit 51 from the main housing 2 as a unit.

In a state where the process cartridge 50 is mounted in the main housing 2, the photosensitive drum 53 is arranged in such an orientation that a rotational axis X thereof is aligned in the left-right direction. The photosensitive drum 53 has a metal drum shaft 53*a* extending along the rotational axis X. The photosensitive drum 53 is rotatable about the rotational axis X.

In the state where the process cartridge 50 is mounted in the main housing 2, the developing roller 59 is arranged in such an orientation that a rotational axis Y thereof is aligned in the left-right direction. The developing roller 59 is rotatable about the rotational axis Y. The rotational axis Y of the developing roller 59 is parallel to the rotational axis X of the photosensitive drum 53.

The exposure unit 41 includes a laser diode, a polygon mirror, lenses, and reflecting mirrors. The exposure unit 41 is configured to expose the surface of the photosensitive drum 53 to light by emitting a laser light toward the photosensitive drum 53 based on image data inputted into the image-forming apparatus 1.

The toner chamber 57 is configured to store toner as a developer. The toner accommodated in the toner chamber 57 is configured to be supplied onto the supply roller 58 while being agitated by agitators 571 and 572. The supply roller 58 is configured to supply the toner received from the toner chamber 57 to the developing roller 59.

The developing roller 59 is arranged in close contact with the supply roller 58. The developing roller 59 is configured to carry the toner that has been positively charged and supplied from the supply roller 58. The developing roller 59 is configured to be applied with a developing bias by a bias applying means (not illustrated).

The photosensitive drum 53 is arranged adjacent to the developing roller 59. The surface of the photosensitive drum 53 is configured to be exposed to light by the exposure unit 41 after being uniformly charged by the charging roller 54. The exposed areas on the photosensitive drum 53 have a lower potential than other areas, enabling an electrostatic latent image to be formed on the photosensitive drum 53 based on image data. Subsequently, the positively charged toner is supplied from the developing roller 59 onto the surface of the photosensitive drum 53 on which the electrostatic latent image was formed, thereby developing the electrostatic latent image into a visible toner image.

The transfer roller 42 is arranged to face the photosensitive drum 53. The transfer roller 42 is configured to be applied with a transfer bias by a bias applying means (not illustrated). As the transfer bias is applied to the surface of the transfer roller 42, a sheet S is conveyed while being nipped between the transfer roller 42 and the photosensitive drum 53 on which a toner image has been formed. At this time the toner image formed on the surface of the photosensitive drum 53 is transferred onto the surface of the sheet S. After the toner image has been transferred, the sheet S is conveyed to the fixing device 6.

The fixing device 6 includes a heating roller 61, and a pressure roller 62. The image transferred onto the sheet S by the process cartridge 50 is configured to be fixed to the sheet S in the fixing device 6. The heating roller 61 is configured to be heated upon receipt of power from a power source (not illustrated). The pressure roller 62 is arranged to face the heating roller 61. One of the heating roller 61 and pressure roller 62 is urged toward the other by an urging mechanism (not illustrated) so that the heating roller 61 and pressure roller 62 are in close contact with each other.

When a sheet S having a toner image transferred thereon is conveyed to the fixing device 6, the sheet S becomes nipped between the heating roller 61 and pressure roller 62. While the heating roller 61 and pressure roller 62 convey the sheet S with the sheet S nipped therebetween, the heating roller 61 heats the sheet S to thermally fix the toner image thereon. In this way, the toner image is fixed to the sheet S in the fixing device 6.

The fixing device 6 includes a post-fixing conveying roller pair 63 configured to convey the sheet S to the discharge unit 7 after the toner image is fixed to the sheet S by the fixing device 6.

The discharge unit 7 is located downstream of the fixing device 6 in the sheet conveying direction. The discharge unit 7 is configured to discharge each sheet S outside of the image-forming apparatus 1 after an image is formed on the sheet S at the image-forming unit 5. The discharge unit 7 includes a discharge roller pair 71, and a discharge tray 72. The discharge roller pair 71 is configured to discharge each sheet S conveyed from the fixing device 6 along the conveying path P toward the outside of the main housing 2. The discharge tray 72 is formed on a top surface of the main housing 2. The discharge tray 72 is configured to support each sheet S discharged out of the main housing 2 by the discharge roller pair 71.

[Process Cartridge]

Figure 4:
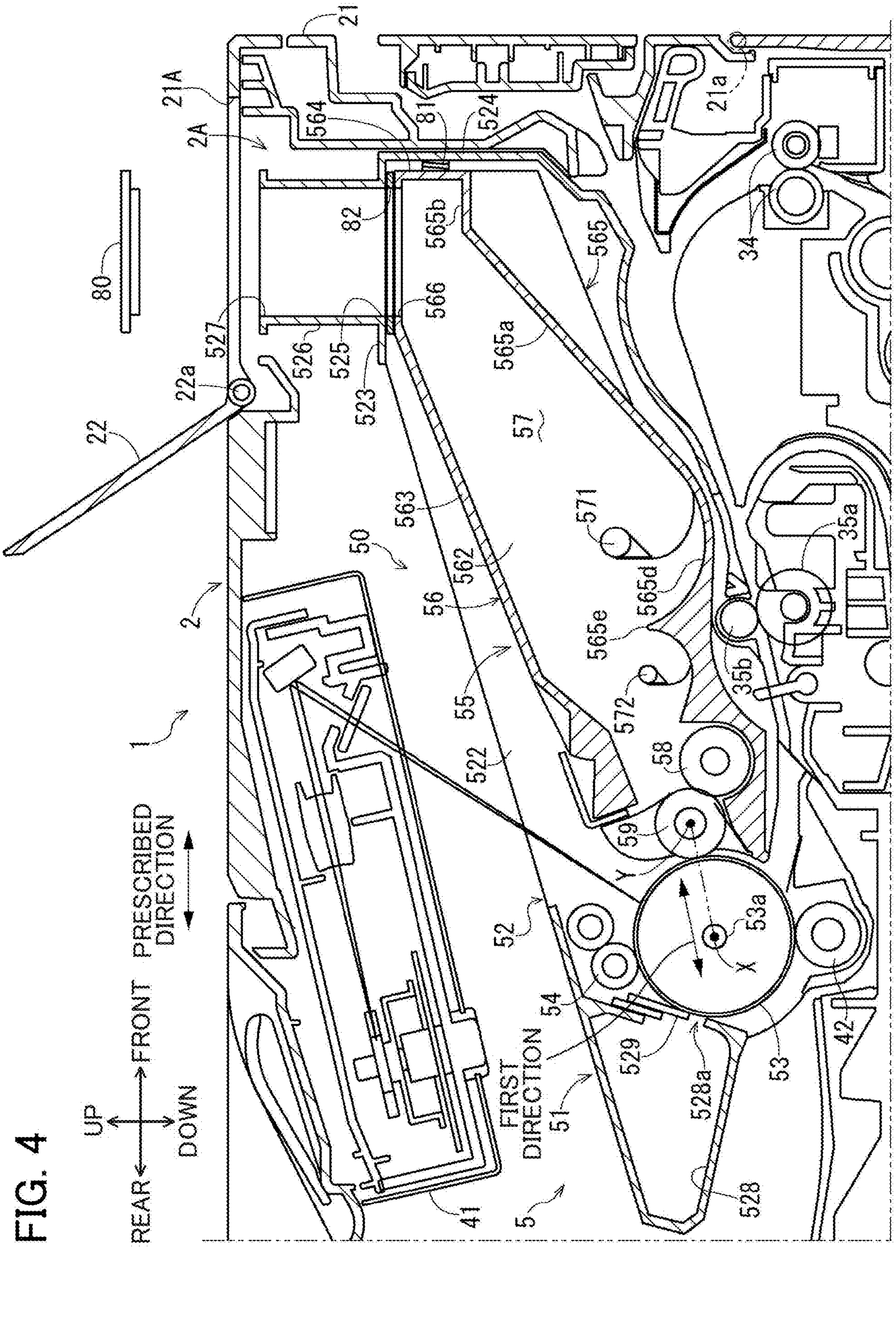
FIG. 4 is a cross-sectional side view of the process cartridge mounted in the main housing.

As illustrated in FIG. 4, the process cartridge 50 is detachably mounted in the main housing 2. In the state where the process cartridge 50 is mounted in the main housing 2, the process cartridge 50 is housed inside the main housing 2. As described above, the process cartridge 50 includes the drum unit 51 and the developing unit 55. That is, the drum unit 51 and developing unit 55 constitute the process cartridge 50. The process cartridge 50 is an example of "process cartridge" of the disclosure. The drum unit 51 is an example of "drum unit" of the disclosure. The developing unit 55 is an example of "developing unit" of the disclosure.

In the state where the process cartridge 50 is mounted in the main housing 2, the drum unit 51 is fixed in position relative to the main housing 2 and the developing unit 55 is movable relative to the drum unit 51.

(Drum Unit)

Figure 5:
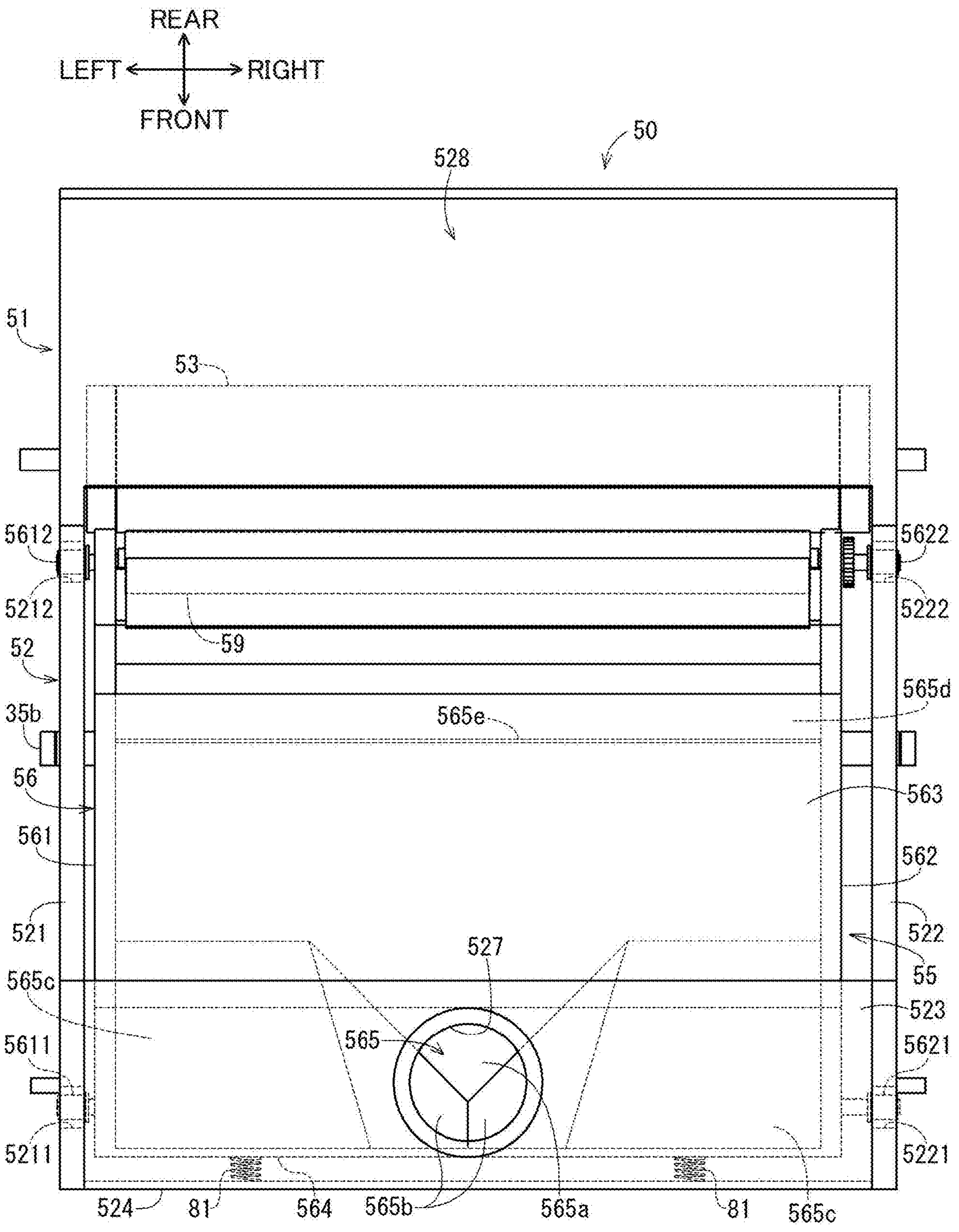
FIG. 5 is a plan view of the process cartridge.
Figure 6:
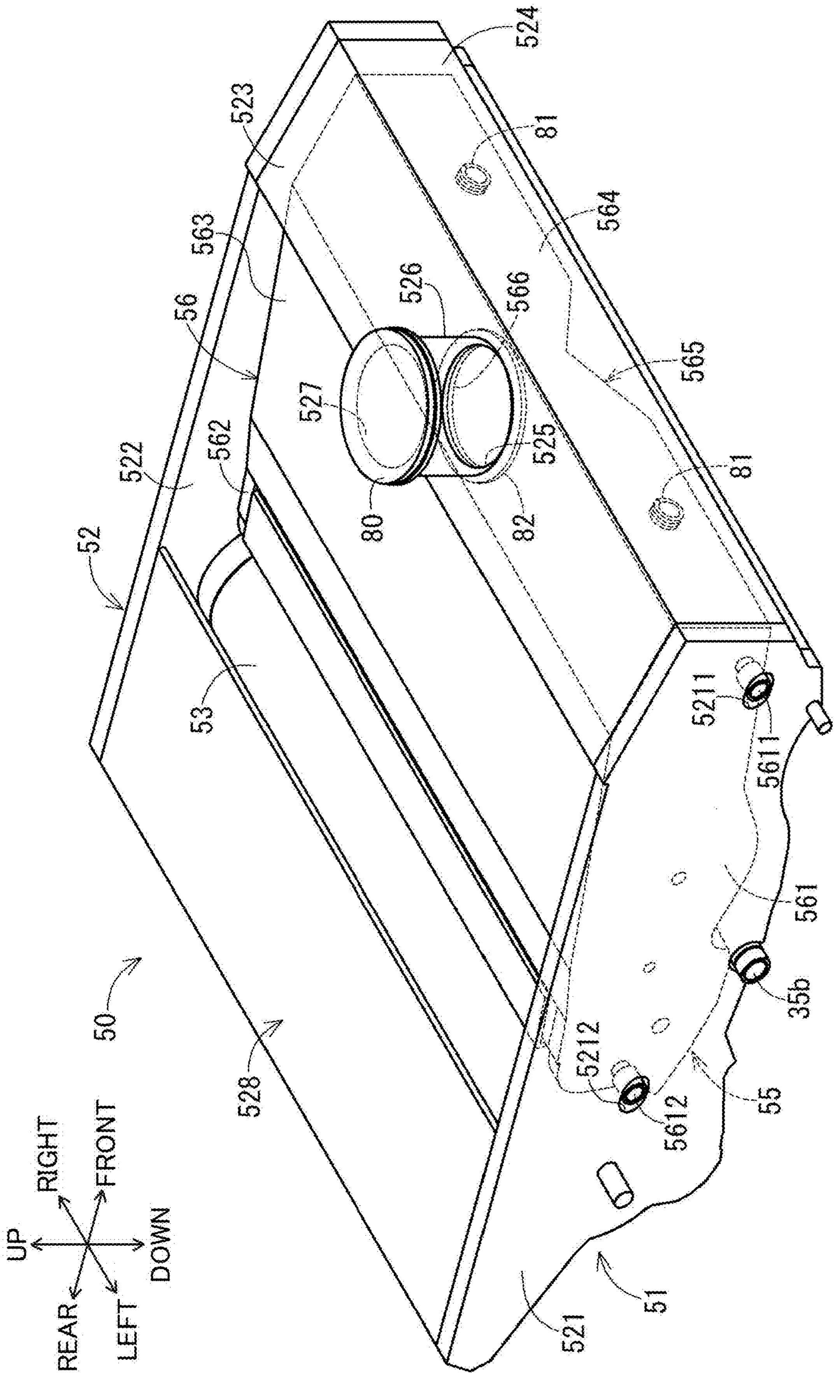
FIG. 6 is a perspective view of the process cartridge.
Figure 7:
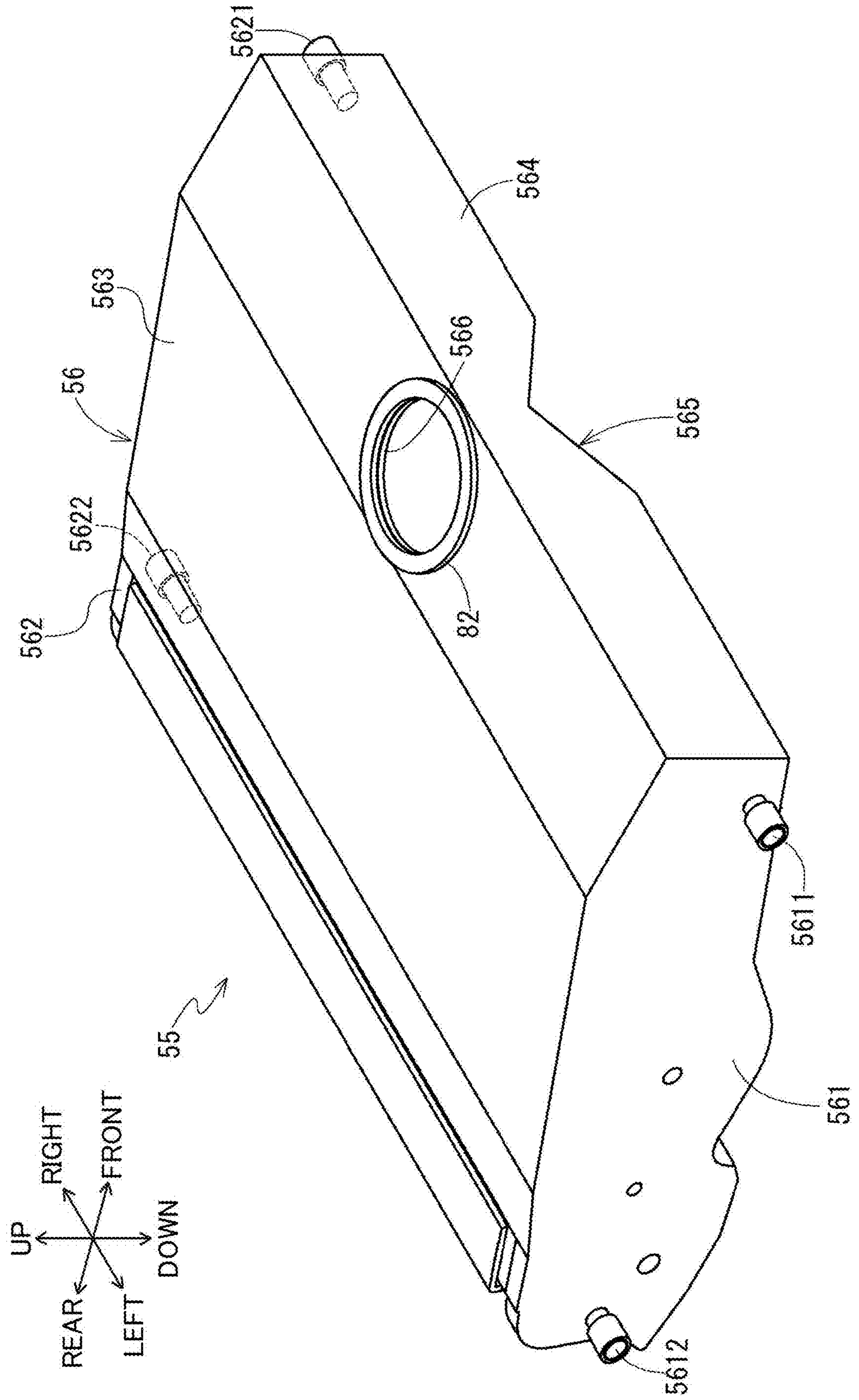
FIG. 7 is a perspective view of a developing unit of the process cartridge.
Figure 8:
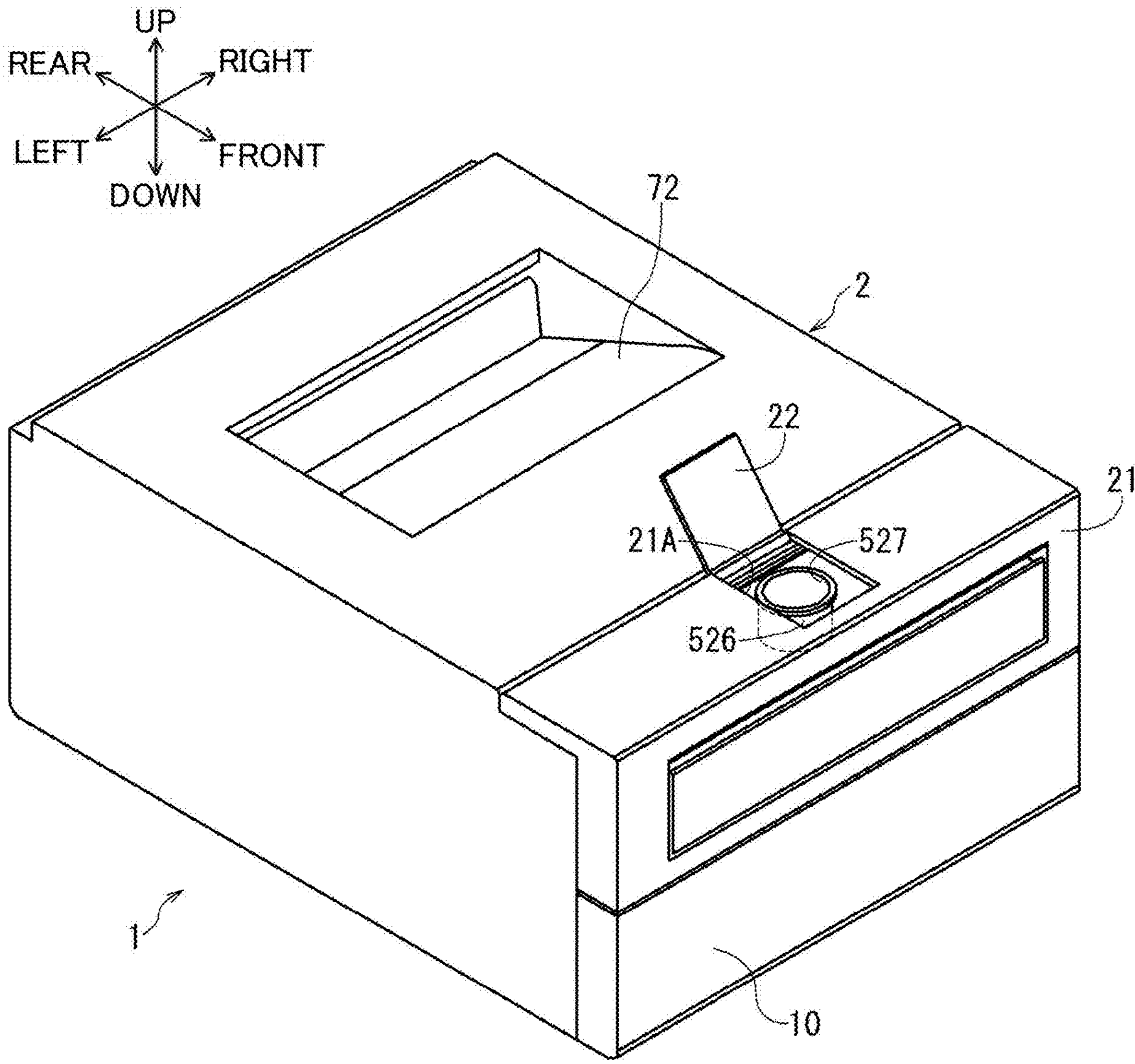
FIG. 8 is a perspective view of the image-forming apparatus in a state where the front cover is in the first closed position and the refill cover is in a second open position.

As illustrated in FIGS. 4 through 6, the drum unit 51 further includes a drum frame 52, in addition to the above-described photosensitive drum 53, charging roller 54, and transfer roller 42. The drum frame 52 supports the photosensitive drum 53, charging roller 54, and transfer roller 42. The photosensitive drum 53, charging roller 54, and transfer roller 42 are arranged at a rear end portion of the drum unit 51 in a front-rear direction. The rear end portion of the drum unit 51 is an example of "one end portion" of the drum unit of the disclosure. The front-rear direction is an example of "prescribed direction" of the disclosure.

The drum frame 52 includes a left side plate 521, a right side plate 522, a top plate 523, a front plate 524, an outlet port 525, a connecting part 526, an inlet port 527, a waste toner container 528, and a blade 529.

The left side plate 521 constitutes a left end portion of the drum frame 52, and the right side plate 522 constitutes a right end portion of the drum frame 52. The left side plate 521 and right side plate 522 each extend in both the front-rear direction and an up-down direction. The left side plate 521 and right side plate 522 oppose each other in the left-right direction. The photosensitive drum 53, charging roller 54, and transfer roller 42 are positioned between the left side plate 521 and right side plate 522.

The left side plate 521 has a first elongate hole 5211 and a second elongate hole 5212 each extending through the left side plate 521 in the left-right direction. Each of the first elongate hole 5211 and second elongate hole 5212 is an elongated through-hole whose long axis is aligned in a first direction. The first direction is a direction of a line connecting the rotational axis X of the photosensitive drum 53 to the rotational axis Y of the developing roller 59 (see FIG. 4). The first direction is sloped relative to the front-rear direction, and also crosses the rotational axis X of the photosensitive drum 53. The first elongate hole 5211 is positioned in a front end portion of the left side plate 521, and the second elongate hole 5212 is positioned rearward of the first elongate hole 5211.

The right side plate 522 has a first elongate hole 5221 and a second elongate hole 5222 each extending through the right side plate 522 in the left-right direction. Each of the first elongate hole 5221 and second elongate hole 5222 is an elongated through-hole whose long axis extends in the first direction. The first elongate hole 5221 is positioned in a front end portion of the right side plate 522, and the second elongate hole 5222 is positioned rearward of the first elongate hole 5221.

The top plate 523 constitutes a top-front end portion of the drum frame 52. The top plate 523 extends in both the left-right direction and front-rear direction. The top plate 523 connects the left side plate 521 and the right side plate 522 to each other. The front plate 524 extends downward from a front end of the top plate 523, and connects the left side plate 521 and right side plate 522 to each other.

The outlet port 525 is formed in a left-right center region of the top plate 523. The outlet port 525 extends through the top plate 523 in the up-down direction and has a circular shape. The connecting part 526 has a cylindrical shape that extends upward from a peripheral edge of the outlet port 525 in the top plate 523. The inlet port 527 is open on a top end of the connecting part 526. The connecting part 526 connects the inlet port 527 and the outlet port 525 to each other. A cap 80 is attached to the top end of the connecting part 526. The cap 80 closes the inlet port 527. The outlet port 525 is an example of "outlet port" of the disclosure. The inlet port 527 is an example of "inlet port" of the drum unit of the disclosure. The connecting part 526 is an example of "connecting part" of the drum unit of the disclosure.

The outlet port 525, connecting part 526, and inlet port 527 are arranged at a front end portion of the drum unit 51. The front end portion of the drum unit 51 is an example of "other end portion" of the drum unit of the disclosure.

The waste toner container 528 is positioned at a rear end portion of the drum unit 51. The waste toner container 528 is positioned rearward of the photosensitive drum 53. The waste toner container 528 has an opening **528*a* that is arranged to oppose the photosensitive drum 53. The waste toner container 528** can accommodate waste toner therein.

The blade 529 is a plate-shaped member extending in the left-right direction. The blade 529 is in contact with the surface of the photosensitive drum 53. The blade 529 is mounted on a periphery of the opening **528*a* in the waste toner container 528. As the photosensitive drum 53 rotates, waste toner deposited on the surface of the photosensitive drum 53 is scraped off the photosensitive drum 53 by the blade 529 and falls through the opening 528*a* to be collected in the waste toner container 528**.

(Developing Unit)

As illustrated in FIGS. 4 through 7, the developing unit 55 further includes a developing unit frame 56, in addition to the supply roller 58 and developing roller 59. The developing unit frame 56 supports the supply roller 58 and developing roller 59. The supply roller 58 and developing roller 59 are disposed in a rear end portion of the developing unit 55. The toner chamber 57 is formed in an interior of the developing unit frame 56. The rear end portion of the developing unit 55 is an example of "one end portion" of the developing unit of the disclosure.

The developing unit frame 56 is positioned inside a space defined by the left side plate 521, right side plate 522, top plate 523, and front plate 524 of the drum frame 52. The developing unit frame 56 has a left side wall 561, a right side wall 562, a top wall 563, a front wall 564, a bottom wall 565, and a supply port 566.

The left side wall 561 constitutes a left end portion of the developing unit frame 56, and the right side wall 562 constitutes a right end portion of the developing unit frame 56. The left side wall 561 and right side wall 562 each extend in both the front-rear direction and up-down direction, and oppose each other in the left-right direction. The supply roller 58 and developing roller 59 are positioned between the left side wall 561 and the right side wall 562.

The left side wall 561 has a first pin 5611 and a second pin 5612 each protruding leftward from a left surface of the left side wall 561. The first pin 5611 is positioned at a front end portion of the left side wall 561, and the second pin 5612 is positioned on a rear end portion of the left side wall 561. The second pin 5612 is positioned rearward of the first pin 5611. The second pin 5612 may be a left end of a rotational shaft of the developing roller 59.

The first pin 5611 and second pin 5612 are respectively fitted in the first elongate hole 5211 and second elongate hole 5212 formed in the left side plate 521 of the drum frame 52. The first pin 5611 and second pin 5612 are movable in directions along the long axes of the first elongate hole 5211 and second elongate hole 5212, respectively.

The right side wall 562 has a first pin 5621 and a second pin 5622 each protruding rightward from a right surface of the right side wall 562. The first pin 5621 is positioned on a front end portion of the right side wall 562, and the second pin 5622 is positioned on a rear end portion of the right side wall 562. The second pin 5622 is positioned rearward of the first pin 5621. The second pin 5622 may be a right end of the rotational shaft of the developing roller 59.

The first pin 5621 and second pin 5622 are respectively fitted in the first elongate hole 5221 and second elongate hole 5222 formed in the right side plate 522 of the drum frame 52. The first pin 5621 and second pin 5622 are movable in directions along the long axes of the first elongate hole 5221 and second elongate hole 5222, respectively.

With the first pin 5611 and second pin 5612 moving along the long axes of the first elongate hole 5211 and second elongate hole 5212 and the first pin 5621 and second pin 5622 moving along the long axes of the first elongate hole 5221 and second elongate hole 5222, the developing unit 55 can move in the first direction relative to the drum unit 51. Accordingly, the developing roller 59 is movable in the first direction relative to the photosensitive drum 53.

The top wall 563 constitutes a top end portion of the developing unit frame 56. The top wall 563 extends in both the left-right direction and front-rear direction and connects the left side wall 561 and the right side wall 562 to each other. The supply port 566 is open in a left-right center region of the top wall 563 at a front end portion thereof. Thus, the supply port 566 is formed at a front end portion of the developing unit 55 in the front-rear direction. The supply port 566 is in communication with the toner chamber 57. The front end portion of the developing unit 55 is an example of "other end portion" of the developing unit of the disclosure.

The front wall 564 extends downward from a front end of the top wall 563 and connects the left side wall 561 and the right side wall 562 to each other.

The bottom wall 565 constitutes a bottom end portion of the developing unit frame 56. The bottom wall 565 extends in both the left-right direction and front-rear direction and connects the left side wall 561 and right side wall 562 to each other. The bottom wall 565 has a first bottom surface **565*a*, a pair of second bottom surfaces 565*b*, a pair of third bottom surfaces 565*c*, a fourth bottom surface 565*d*, and a projecting wall 565*e*. The first bottom surface 565*a*, second bottom surfaces 565*b*, third bottom surfaces 565*c*, and fourth bottom surface 565*d* are surfaces of the bottom wall 565 facing upward and constitute in combination a bottom surface of the toner chamber 57**.

The first bottom surface **565*a* and second bottom surfaces 565*b* are positioned below the supply port 566. The first bottom surface 565*a* extends rearward from a position at which the supply port 566 is projected vertically onto the bottom surface of the toner chamber 57. The first bottom surface 565***a* is a sloped surface that slopes downward toward the rear.

That is, the first bottom surface 565*a* is a sloped surface that slopes downward as extending away from the position at which the supply port 566 is projected vertically onto the bottom surface of the toner chamber 57. Further, the first bottom surface 565*a* slopes downward toward the developing roller 59 from the position at which the supply port 566 is projected vertically onto the bottom surface of the toner chamber 57. The first bottom surface 565*a* is an example of "first sloped surface" of the disclosure.

The second bottom surfaces 565*b* extend respectively leftward and rightward from the position at which the supply port 566 is projected vertically onto the bottom surface of the toner chamber 57. The second bottom surfaces 565*b* are sloped surfaces that slope downward toward the left and right, respectively. Specifically, the second bottom surface 565*b* on the left slopes downward toward the left, whereas the second bottom surface 565*b* on the right slopes downward toward the right.

That is, the second bottom surfaces 565*b* are sloped surfaces that slope downward while extending away from the position at which the supply port 566 is projected vertically onto the bottom surface of the toner chamber 57. Further, the second bottom surfaces 565*b* slope downward while extending away from the position at which the supply port 566 is projected vertically onto the bottom surface of the toner chamber 57 in directions along the rotational axis Y of the developing roller 59. The second bottom surfaces 565*b* are an example of "second sloped surface" of the disclosure.

The third bottom surfaces 565*c* are formed continuously with the respective second bottom surfaces 565*b* to extend leftward or rightward. Specifically, the third bottom surface 565*c* on the left is connected to the second bottom surface 565*b* on the left to extend leftward therefrom, and the third bottom surface 565*c* on the right is connected to the second bottom surface 565*b* on the right to extend rightward therefrom. The third bottom surfaces 565*c* are sloped surfaces that slope downward toward the rear. Each third bottom surface 565*c* has a rear end connected to the fourth bottom surface 565*d* that is positioned rearward of the third bottom surfaces 565*c*.

The fourth bottom surface 565*d* extends rearward from a rear end of the first bottom surface 565*a* and the rear end of each third bottom surface 565*c*. The projecting wall 565*e* protrudes into the toner chamber 57 from the fourth bottom surface 565*d* and extends in a direction parallel to the rotational axis Y of the developing roller 59. The agitators 571 and 572 are arranged inside the toner chamber 57 in areas near the fourth bottom surface 565*d*. The projecting wall 565*e* is an example of "projecting wall" of the disclosure.

The toner chamber 57 is defined as a space enclosed by the left side wall 561, right side wall 562, top wall 563, front wall 564, and bottom wall 565 of the developing unit frame 56. The toner chamber 57 has a rear end that is open, and the developing roller 59 is disposed in the open rear end of the toner chamber 57.

(Compression Springs)

As illustrated in FIGS. 4 through 6, the front plate 524 of the drum frame 52 opposes the front wall 564 of the developing unit frame 56 in the front-rear direction. A pair of compression springs 81 is interposed between the front plate 524 and the front wall 564. The compression springs 81 function to urge the developing unit frame 56 rearward relative to the drum frame 52.

Through urging forces of the compression springs 81, the developing unit frame 56 is movable in the first direction along the long axes of the first elongate holes 5211 and 5221 and the long axes of the second elongate holes 5212 and 5222. As the developing unit frame 56 moves in the first direction, the developing roller 59 moves in the first direction toward the photosensitive drum 53. In other words, the compression springs 81 are pressing members that press the developing roller 59 toward the photosensitive drum 53 in the first direction. The compression springs 81 are an example of "pressing member" of the disclosure.

Since the developing roller 59 is movable in the first direction relative to the photosensitive drum 53 and the compression springs 81 are configured to press the developing roller 59 in the first direction toward the photosensitive drum 53, any outer diameter run-out in the developing roller 59 can be restrained, thereby ensuring that the developing roller 59 rotates smoothly.

(Positional Relationships of the Inlet, Outlet, and Supply Port)

As illustrated in FIGS. 4 through 6, the outlet port 525 is positioned upward of the supply port 566 and the inlet port 527 is positioned upward of the outlet port 525 in the state where the process cartridge 50 is mounted in the main housing 2. In other words, the inlet port 527, outlet port 525, and supply port 566 are arranged in this order from top to bottom.

The outlet port 525 is formed to have the same size as the inlet port 527, and the supply port 566 is formed to have the same size as the outlet port 525. In the state where the process cartridge 50 is mounted in the main housing 2, the inlet port 527, outlet port 525, and supply port 566 are positioned to at least partially overlap each other when viewed in the up-down direction, regardless of the position of the developing unit 55 relative to the drum unit 51.

However, alternatively, the outlet port 525 may be formed to have a larger size than the inlet port 527, and the supply port 566 may be formed to have a larger size than the outlet port 525, so that the outlet port 525 could fall within a range of the supply port 566 and the inlet port 527 could fall within a range of the outlet port 525 when viewed in the up-down direction, regardless of the position of the developing unit 55 relative to the drum unit 51.

(Seal Member)

A seal member 82 is provided in a gap between the supply port 566 in the developing unit frame 56 and the outlet port 525 in the drum frame 52. The seal member 82 is formed of an elastic member in an annular shape that can elastically deform, such as a sponge.

The seal member 82 has a bottom surface in contact with a periphery of the supply port 566 in the top wall 563 of the developing unit frame 56. The seal member 82 has a top surface in contact with a periphery of the outlet port 525 in the top plate 523 of the drum frame 52. As such, the seal member 82 seals the gap between the supply port 566 and the outlet port 525. The seal member 82 thus connects the outlet port 525 to the supply port 566.

Incidentally, the bottom surface of the seal member 82 may be fixed to the periphery of the supply port 566 in the top wall 563 of the developing unit frame 56, or the top surface of the seal member 82 may be fixed to the periphery of the outlet port 525 in the top plate 523 of the drum frame 52. Alternatively, the bottom surface of the seal member 82 may be fixed to the periphery of the supply port 566 in the top wall 563 of the developing unit frame 56, and the top surface of the seal member 82 may be fixed to the periphery of the outlet port 525 in the top plate 523 of the drum frame 52.

By elastically deforming, the seal member 82 can tolerate relative movement between the supply port 566 and the outlet port 525. Therefore, the seal member 82 can maintain the sealing between the supply port 566 and the outlet port 525, even if the supply port 566 is caused to move relative to the outlet port 525 by the developing unit frame 56 moving relative to the drum frame 52.

[Front Cover and Refill Cover]

As illustrated in FIGS. 1 through 4 and 8, the front cover 21 has an opening 21A. The opening 21A is formed in a top surface of the front cover 21 in the first closed position, and extends through the front cover 21 at the first closed position in the up-down direction. The opening 21A has a rectangular shape. The opening 21A is an example of "second opening" of the disclosure.

The main housing 2 also includes a refill cover 22. The refill cover 22 is provided on the front cover 21 and is configured to open and close the opening 21A. The refill cover 22 is movable between a second closed position (illustrated in FIG. 2) for closing the opening 21A and a second open position (illustrated in FIG. 8) for exposing the opening 21A. The refill cover 22 is formed in a rectangular shape corresponding to the shape of the opening 21A. The refill cover 22 is an example of "second cover" of the disclosure.

The refill cover 22 is movable between the second closed position and the second open position by pivoting about an axis of a pivot shaft 22*a*. The pivot shaft 22*a* is located on a rear end portion of the refill cover 22 and extends in the left-right direction. The refill cover 22 is positioned farther rearward in the second open position than in the second closed position.

In a state where the front cover 21 is in the first closed position, the inlet port 527 of the drum unit 51 is positioned beneath the opening 21A in the front cover 21 and the opening 21A is in communication with the inlet port 527. In a state where the front cover 21 is in the first closed position and the refill cover 22 is in the second open position, the inlet port 527 is exposed to the outside of the main housing 2 through the opening 21A (see FIGS. 4 and 8). In a state where the front cover 21 is in the first closed position and the refill cover 22 is in the second closed position, the refill cover 22 closes the opening 21A and covers the inlet port 527 from above (see FIGS. 1 and 2).

[Replenishing the Process Cartridge with Toner from the Toner Container]

As illustrated in FIG. 4, the inlet port 527 of the drum unit 51 can be exposed outside of the main housing 2 by moving the refill cover 22 to the second open position while the front cover 21 is in the first closed position and by removing the cap 80 from the top end of the connecting part 526. With the inlet port 527 exposed to the outside, the toner container 90 can be connected to the inlet port 527.

Figure 9:
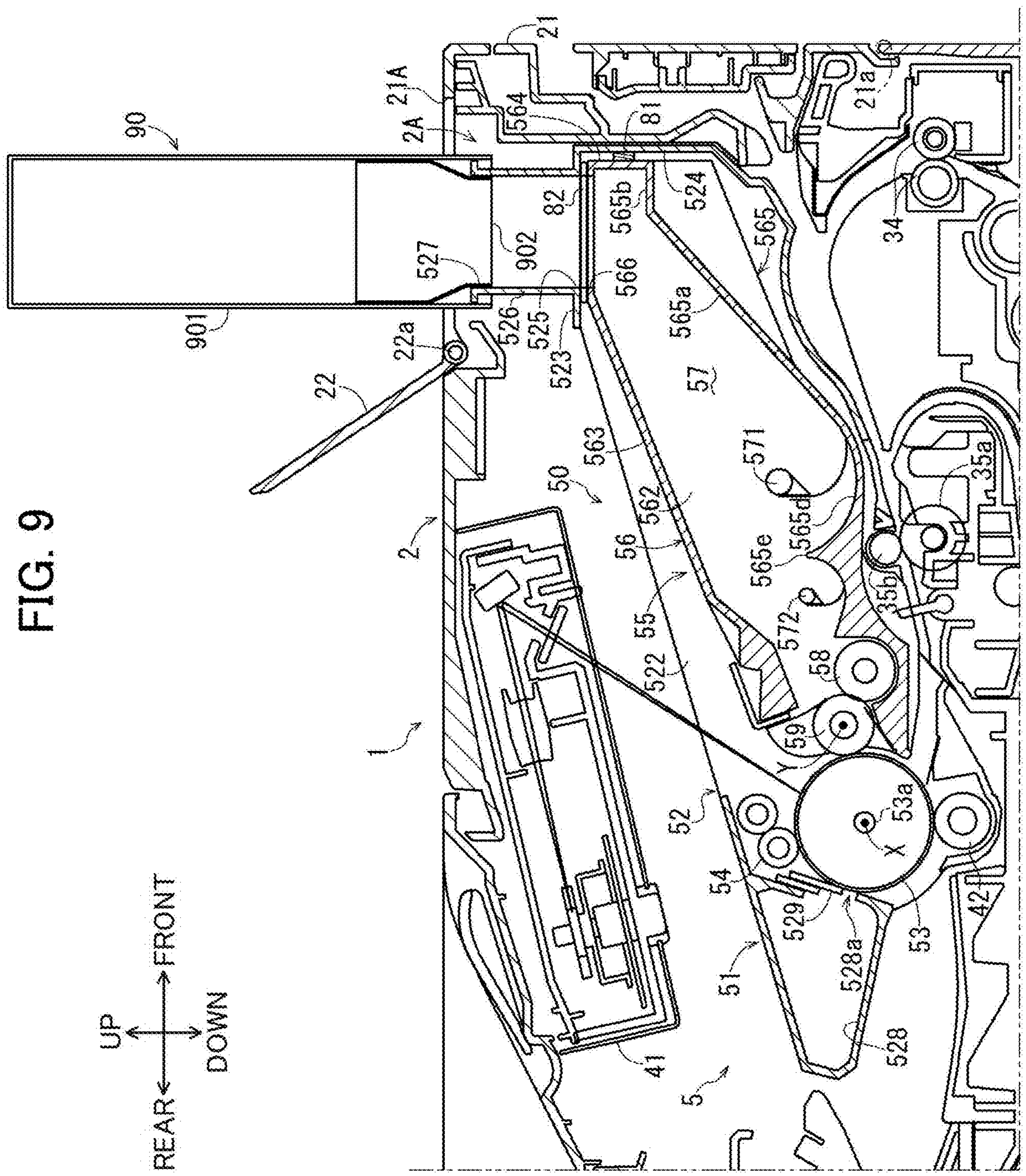
FIG. 9 is a cross-sectional side view illustrating a state where a toner container is connected to an inlet port of a drum unit of the process cartridge.

By connecting the toner container 90 to the inlet port 527 while the inlet port 527 is exposed to the outside, as illustrated in FIG. 9, the toner chamber 57 of the process cartridge 50 can be replenished with the toner from the toner container 90. Since the toner container 90 is connected to the inlet port 527 at this time, the inlet port 527 receives the toner from the toner container 90. The toner chamber 57 stores therein the toner supplied from the toner container 90.

The toner container 90 has a container body 901 that stores the toner, and a connection port 902 that can be connected to the inlet port 527. By connecting the connection port 902 of the toner container 90 to the inlet port 527 of the drum unit 51 with the connection port 902 of the toner container 90 facing downward, the toner stored in the container body 901 can be supplied into the toner chamber 57 by self-weight of the toner.

In this case, the toner container 90 is connected to the inlet port 527 of the drum unit 51 in the state where the process cartridge 50 is mounted in the main housing 2 with the drum unit 51 fixed in position relative to the main housing 2. Hence, the toner container 90 can be easily connected to the process cartridge 50 even if the developing unit 55 is configured to move relative to the drum unit 51.

If the toner container 90 were directly to be connected to the developing unit 55, conceivably, the toner container 90 could collude on the developing unit 55 upon connection thereto, which may result in the photosensitive drum 53 being damaged by the impacted developing unit 55. However, such a problem can be avoided in the configuration of the present embodiment since the toner container 90 is configured to be connected to the inlet port 527 of the drum unit 51 whose position is fixed relative to the main housing 2.

Further, the inlet port 527, outlet port 525, and supply port 566 are arranged to at least partially overlap each other when viewed in the up-down direction, which is the direction in which the outlet port 525 and supply port 566 are connected to each other. With this structure, the toner in the toner container 90 can flow smoothly into the toner chamber 57 of the developing unit 55 through the inlet port 527, outlet port 525, and supply port 566. Thus, the developing unit 55 can be easily replenished with the toner from the toner container 90.

Further, the photosensitive drum 53 is arranged at the rear end portion of the drum unit 51; the inlet port 527 and outlet port 525 are arranged at the front end portion of the drum unit 51; the developing roller 59 is arranged at the rear end portion of the developing unit 55; and the supply port 566 is arranged at the front end portion of the developing unit 55.

Therefore, in a configuration where the photosensitive drum 53 and developing roller 59 are positioned at a center region inside the main housing 2 when the process cartridge 50 is mounted in the main housing 2, the inlet port 527 and outlet port 525 of the drum unit 51 and the supply port 566 of the developing unit 55 can be located near the front end of the main housing 2. This arrangement can improve user's workability for connecting the toner container 90 to the inlet port 527.

Moreover, the outlet port 525 may be formed to have a larger size than the inlet port 527 and the supply port 566 may be formed to have a larger size than the outlet port 525. In this case, the outlet port 525 can fall within the range of the supply port 566 and the inlet port 527 can fall within the range of the outlet port 525 when viewed in the up-down direction.

With this configuration, when the toner container 90 is connected to the inlet port 527 and the developing unit 55 is refilled with the toner from the toner container 90, the toner can flow smoothly into the toner chamber 57 of the developing unit 55 without being trapped on the peripheries of the outlet port 525 and supply port 566.

The top surface of the bottom wall 565 facing upward, which defines the bottom surface of the toner chamber 57, includes the first bottom surface 565*a* and the second bottom surfaces 565*b*, which are sloped surfaces that slope downward as extending away from the position at which the supply port 566 is projected vertically onto the bottom surface of the toner chamber 57. Therefore, the toner introduced into the toner chamber 57 through the supply port 566 can flow in directions away from the supply port 566, thereby restraining the toner from accumulating in one area of the toner chamber 57 beneath the supply port 566.

In particular, the first bottom surface 565*a* is a sloped surface that slopes downward toward the developing roller 59 from the position at which the supply port 566 is projected vertically onto the bottom surface of the toner chamber 57; and the second bottom surfaces 565*b* are sloped surfaces that slope downward while extending in directions along the rotational axis Y of the developing roller 59 away from the position at which the supply port 566 is projected vertically onto the bottom surface of the toner chamber 57.

With this structure, the toner supplied into the toner chamber 57 is allowed to flow from the supply port 566 in directions toward the developing roller 59 and along the rotational axis Y of the developing roller 59, thereby enabling the toner to be accumulated uniformly inside the toner chamber 57.

The developing unit 55 also has the projecting wall 565*e* extending along the rotational axis Y of the developing roller 59 and protruding into the toner chamber 57 from the fourth bottom surface 565*d*. With this structure, when the toner supplied into the toner chamber 57 through the supply port 566 flows toward the developing roller 59, the projecting wall 565*e* can temporarily impede the toner from flowing farther and force the toner to spread out along the rotational axis Y of the developing roller 59. Hence, the toner in the toner chamber 57 can circulate across a wider area in the toner chamber 57.

[Variation of the Seal Member]

Figure 10:
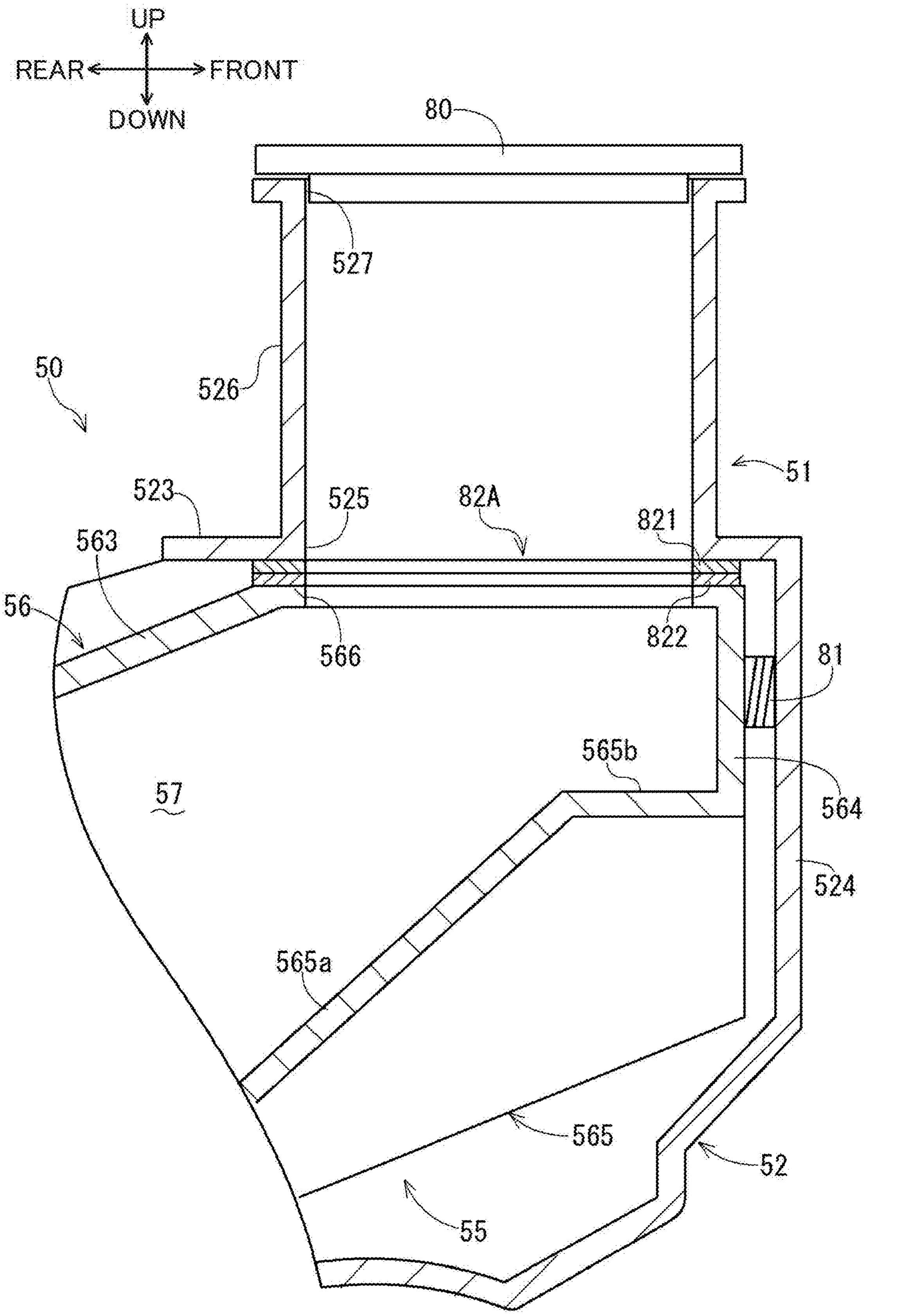
FIG. 10 is a cross-sectional side view of a seal member.

The seal member of the disclosure may also be formed like a seal member 82A illustrated in FIG. 10. The seal member 82A of this modification has a first part 821 and a second part 822 each of which has an annular shape. The first part 821 and second part 822 are both elastic members, such as sponges, that are elastically deformable. The first part 821 and second part 822 are arranged to overlap each other in the up-down direction, with the first part 821 positioned above the second part 822.

The first part 821 has a top surface fixed to the top plate 523 of the drum frame 52 to surround the outlet port 525. The second part 822 has a bottom surface fixed to the top wall 563 of the developing unit frame 56 to surround the supply port 566. A bottom surface of the first part 821 is in contact with a top surface of the second part 822.

The seal member 82A having the first part 821 and the second part 822 seals the gap between the supply port 566 and the outlet port 525. The seal member 82A also connects the outlet port 525 to the supply port 566.

Through elastic deformation of the first part 821 and the second part 822, the seal member 82A can tolerate relative movement between the supply port 566 and the outlet port 525. Therefore, the seal member 82A can maintain the sealing between the supply port 566 and the outlet port 525, even if the supply port 566 moves relative to the outlet port 525 due to the developing unit frame 56 moving relative to the drum frame 52.

Further, since the first part 821 and second part 822 are formed separately from each other in the seal member 82A, the seal member 82A can seal the gap between the supply port 566 and the outlet port 525 upon completion of assembly of the drum unit 51 (having the first part 821 fixed to the drum unit 51) and developing unit 55 (having the second part 822 fixed to the developing unit 55). This configuration can improve workability for assembling the drum unit 51 and developing unit 55 together to constitute the process cartridge 50.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image-forming apparatus comprising:
a main housing;
a drum unit including:
a photosensitive drum;
an inlet port to which a toner container storing toner is connectable for receiving the toner from the toner container;
an outlet port; and
a connecting part connecting the inlet port to the outlet port;
a developing unit including:
a developing roller; and
a supply port connected to the outlet port; and
a seal member interposed between the outlet port and the supply port for sealing a gap therebetween, the seal member being elastically deformable to allow the supply port to move relative to the outlet port,
wherein the drum unit and the developing unit constitute a process cartridge mountable in the main housing, and
wherein, in a state where the process cartridge is mounted in the main housing, the inlet port, the outlet port and the supply port are arranged such that at least a part of the inlet port, a part of the outlet port and a part of the supply port overlap each other when viewed in an up-down direction.

2. The image-forming apparatus according to claim 1,
wherein the developing roller is movable relative to the photosensitive drum in a first direction crossing a rotational axis of the photosensitive drum,
the image-forming apparatus further comprising a pressing member that urges the developing roller toward the photosensitive drum in the first direction.

3. The image-forming apparatus according to claim 1,
wherein the drum unit has one end portion and an other end portion opposite each other in a prescribed direction crossing a rotational axis of the photosensitive drum,
wherein the developing unit has one end portion and an other end portion opposite each other in the prescribed direction, and
wherein
the photosensitive drum is positioned at the one end portion of the drum unit in the prescribed direction,
the inlet port and the outlet port are positioned at the other end portion of the drum unit in the prescribed direction,
the developing roller is positioned at the one end portion of the developing unit in the prescribed direction, and
the supply port is positioned at the other end portion of the developing unit in the prescribed direction.

4. The image-forming apparatus according to claim 1, wherein the outlet port is positioned upward of the supply port, wherein the inlet port is positioned upward of the outlet port, wherein the outlet port has a size equal to or larger than a size of the inlet port, wherein the supply port has a size equal to or larger than a size of the outlet port, and wherein, when viewed in the up-down direction, the outlet port falls within a range of the supply port, and the inlet port falls within a range of the outlet port.

5. The image-forming apparatus according to claim 1, wherein the developing unit further includes a toner chamber in communication with the supply port and configured to store the toner supplied from the toner container, the toner chamber having a bottom surface, and wherein the bottom surface of the toner chamber includes a sloped surface sloping downward as extending away from a position where the supply port is projected onto the bottom surface of the toner chamber in the up-down direction.

6. The image-forming apparatus according to claim 5, wherein the sloped surface includes:

a first sloped surface sloping downward as extending toward the developing roller from the position where the supply port is projected onto the bottom surface of the toner chamber in the up-down direction; and a second sloped surface sloping downward as extending in directions along a rotational axis of the developing roller away from the position where the supply port is projected onto the bottom surface of the toner chamber in the up-down direction.

7. The image-forming apparatus according to claim 5, wherein the developing unit further includes a projecting wall protruding into the toner chamber from the bottom surface of the toner chamber, the projecting wall being positioned between the supply port and the developing roller and extending in a direction along a rotational axis of the developing roller.

8. The image-forming apparatus according to claim 1, wherein the seal member includes:

a first part fixed to a periphery of the supply port in the developing unit; and a second part fixed to a periphery of the outlet port in the drum unit.

9. The image-forming apparatus according to claim 1, wherein the main housing has a first opening through which the process cartridge can be inserted into the main housing, the image-forming apparatus further comprising:

a first cover movable relative to the main housing between a first closed position for closing the first opening and a first open position for exposing the first opening, the first cover having a second opening configured to communicate with the inlet port; and a second cover provided on the first cover and movable relative to the first cover between a second closed position for closing the second opening and a second open position for exposing the second opening.

10. The image-forming apparatus according to claim 9, further comprising a cap for closing the inlet port of the drum unit, wherein the inlet port is exposed through the second opening by removing the cap from the inlet port in a state where the first cover is in the first closed position and the second cover is in the second open position.

11. A process unit comprising:

a drum unit including:

a photosensitive drum;

an inlet port to which a toner container storing toner is connectable for receiving the toner from the toner container;

an outlet port; and a connecting part connecting the inlet port to the outlet port;

a developing unit attached to the drum unit, the developing unit including:

a developing roller; and a supply port connected to the outlet port; and a seal member interposed between the outlet port and the supply port for sealing a gap therebetween, the seal member being elastically deformable to allow the supply port to move relative to the outlet port, wherein the inlet port, the outlet port and the supply port are arranged such that at least a part of the inlet port, a part of the outlet port and a part of the supply port overlap each other when viewed in a direction in which the outlet port and the supply port are connected to each other.

12. The process unit according to claim 11, wherein the developing roller is movable relative to the photosensitive drum in a first direction crossing a rotational axis of the photosensitive drum, the process unit further comprising a pressing member that urges the developing roller toward the photosensitive drum in the first direction.

13. The process unit according to claim 11, wherein the drum unit has one end portion and an other end portion opposite each other in a prescribed direction crossing a rotational axis of the photosensitive drum, wherein the developing unit has one end portion and an other end portion opposite each other in the prescribed direction, and wherein the photosensitive drum is positioned at the one end portion of the drum unit in the prescribed direction, the inlet port and the outlet port are positioned at the other end portion of the drum unit in the prescribed direction, the developing roller is positioned at the one end portion of the developing unit in the prescribed direction, and the supply port is positioned at the other end portion of the developing unit in the prescribed direction.

14. The process unit according to claim 11, wherein the seal member includes:

a first part fixed to a periphery of the supply port in the developing unit; and a second part fixed to a periphery of the outlet port in the drum unit.

* * * * *